3,516,781
NOVEL MODIFYING PROCESS
Ildo E. Pensa, Palisades Park, N.J., and Armand L. Greenhall, New York, N.Y., assignors to J. P. Stevens & Co., New York, N.Y., a corporation of Delaware
No Drawing. Filed Feb. 13, 1967, Ser. No. 615,363
Int. Cl. D06m 9/00
U.S. Cl. 8—115.7                                    6 Claims

ABSTRACT OF THE DISCLOSURE

A one-step process for simultaneously modifying both components of cellulosic-proteinaceous blends comprising treating the blend with an acid catalyzed compatible mixture containing at least one protein modifying reagent and at least one cellulosic modifying reagent in the presence of catalyst and optional textile adjuvants, until a modifying amount of both reagents is taken up, and exposing said treated blend to an environment compatible to curing both the blend components, until modification of both components takes place.

---

This invention concerns a novel process for modifying blends of cellulosic and proteinaceous substrates by chemical treatment.

More specifically, this invention relates to a novel one-step process wherein the modification of cellulosic and proteinaceous blends is effected concurrently, using compatible mixtures of modifying reagents.

The term modification as used herein refers to that alteration or improvement of characteristics and properties that are made in the proteinaceous and cellulosic components treated with the modifying agents.

Compatible mixtures refer to combinations of modifying agents which upon admixture substantially retain their ability to modify the treated fabric.

The term cellulosic as used herein refers to fabrics containing no less than about 30%, by weight, of cellulose or fibers derived from cellulose. The latter include, but are not limited to rayon, acetates, viscose rayon, cuprammonium rayon, cotton, linen, jute and the like. The remaining portion of the textile fabric can be a proteinaceous substance such as wool or hair, or a blend of these with synthetics. The latter can be polyesters or polyamides among others.

The modification of textile substrates is well established in the art. Textiles manufactured from various substrates are modified to improve their properties and to make them suitable for new applications. For example, cellulosic fabrics are modified to improve their wash-and-wear characteristics, i.e., to make them resistant to wrinkling and to impart crease retention among other things. The keratinaceous fabrics such as wool, on the other hand, are modified to improve their dimensional stability and shrink resistance upon laundering.

Heretofore, the modification of blends containing cellulosic and proteinaceous components has been done by modifying the cellulosic and wool components in separate and distinct process treatments. The reason for this being that no one modifying system is presently available which is suitable for modifying both cellulose and wool at the same time.

For example, if crease resistance is to be imparted to the cellulosic component and shrink resistance to the wool component, a costly and time-consuming series of separate process steps is required. In one process the fabric must first be treated with an aqueous solution of diamine such as 1,6-hexanediamine to deposit that reagent upon the fabric. Then in a second subsequent step the fabric is treated with a solution of dibasic acid chloride such as adipoyl chloride or sebacoyl chloride in a water-immiscible organic solvent to form a polyamide film in situ. After drying, the treated fabric is washed to remove excess polyamide then contacted in another step with a crosslinking reagent for cellulose in the presence of an appropriate catalyst to crosslink the cellulosic portion of the fabric. Finally, the fabric or garments made from it must be cured to induce the cellulose crosslinking reaction.

The above modification process is unsatisfactory in several respects. For instance, since several different reagent solutions are employed, handling and storage costs are high. In addition, because of the several distinct process steps, considerable time is required to complete a processing cycle and labor costs are substantial. Further, because of the complexity of the in situ preparation of the polyamide and the incompatibility of many crosslinking reagents with the components used to prepare the polyamide, the process does not lend itself to a one-step treatment.

In view of the shortcomings of the multistep treatment of the prior art described above, there is a need for a new and improved process for modifying blends of cellulosics and wool.

Minimally what is required is a simplified procedure in which both the cellulose and wool components can be modified at the same time using a one-step treatment. This in turn requires three conditions to be met:

(1) Compatibility of the wool and cellulosic modifying systems, (2) Good long-term shelf life of the treated substrates, and (3) Compatible cure conditions for the two modifying systems.

Because of the difficulty in selecting modifying systems which satisfy all three conditions, the choice of reagent combinations is critical and cannot be predicted in advance.

A further requirement for a utilizable process is that it would employ readily available reagents utilizing presently known techniques and commercially available apparatus. The desirable process cycle would be relatively short and the process could be carried out by relatively unskilled personnel.

Until recently, no process possessing the necessary combination of requirements was available. Only after considerable experimental work applicants have developed several combinations of modifying agents which satisfy the enumerated criteria.

Thus it is an object, among many others, of this invention to provide a new and simplified process for modifying both the cellulosic and wool fibers in cellulosic-wool blends, by means of a one-step process heretobefore unavailable in the textile art.

It is another more specific object of this invention to concurrently crosslink the cellulosic component and shrinkproof the wool components of cellulosic-wool blends by means of a one-step modification process.

It is an additional object of this invention to prepare heat curable treated wool-cellulose blends which can be stored for appreciable periods of time.

It is a further object of this invention, using the inventive process, to obtain modified cellulosic-wool fabrics having substantially improved properties compared to control blends treated with each modifying agent separately.

Yet an additional object of this invention is to develop a one-step process for modifying both the cellulosic and wool in blended fabrics requiring a lesser expenditure in funds and time than is required with the presently utilized multistep processes of the prior art.

The above objects, among others, are achieved by the process described more fully below:

In practice, a cellulosic-wool substrate is treated with a compatible mixture containing at least one wool modifying reagent, at least one acid-catalyzed cellulosic modifying reagent, necessary catalyst(s) and optional textile adjuvants, until a modifying amount of both modifying reagents is taken up by the treated substrate. The treated substrate is dried below about 150° C., to a moisture content of about 5 to 10%, and exposed to a curing environment which is amenable to the curing of both the wool and cellulosic reagents, until the desired modification takes place. Curing can be carried out on the fabric in the flat state, or after articles made from it have been manufactured and shaped.

In the preferred aspect of this invention a cellulosic-wool fabric containing no less than about 30%, by weight, of cellulose is contacted with a compatible admixture comprising:

(A) From 1 to 10%, by weight, of at least one wool modifying reagent selected from the group consisting of acrylic polymers and aziridine-terminated polymers, (B) From about 2 to 20%, by weight, of at least one acid-catalyzed cellulosic modifying reagent of the N-methylol type, and (C) A catalytic amount of the necessary catalyst or catalysts plus whatever optional textile adjuvants are desired.

After treatment, the amount of wet pickup of the above admixture is controlled in the usual manner (such as by the use of rollers) to about the 75–125%, by weight, level and the treated fabric is dried, preferably to about a 5–10% moisture content. After drying, one or more desired shapes or configurations are imparted to the fabric and the configured fabric or article made from it is pressed at about 120–160° C., for a time sufficient to impress the configuration, then cured by exposing the fabric to elevated temperatures. The time required for curing varies according to curing temperature, lower temperatures requiring longer times and vice versa. At the preferred curing temperature range of about 150–165° C., the time varies between about 7–20 minutes.

The preferred group of cellulosic modifying reagents of the N-methylol type includes cyclic and acyclic methylol derivatives of ureas such as dimethylol-ethyleneurea, urea-formaldehyde, dimethylol-ureas and triazones, dimethylol-carbamates, dimethylol-dihydroxy-imidazolidones among many others. These modifying agents are preferably activated by a catalyst system comprising a metallic salt or salts such as magnesium chloride, magnesium nitrate, zinc chloride, zinc nitrate, and the like.

As indicated above, the preferred group of wool-modifying reagents employed in this invention are acrylic and alkylenimine-terminated polymers.

Illustrative acrylic polymers which lend themselves to the practice of the invention are polyacrylates derived from acrylic or methacrylic monomers or copolymers of these with many different types of monomers. A favored group of polyacrylics are those polymers containing reactive functional groups which cause crosslinking in the presence of heat and acid catalyst such as have been described as catalysts for the N-methylol type of reagents.

The favored polyacrylates are those containing carboxyl, amide, epoxy, and hydroxyl groups. An illustrative listing of suitable polyacrylates is found in a recent publication of Feldtman et al. in Textile Research Journal, vol. 35, No. 2, particularly on page 151. The recited polyacrylates include aqueous dispersions containing 46% solids referred to as Primal K–3, HA–8, HA–12 and HA–16. The "Primals" are supplied by Primal Chemicals Pty. Ltd., Australia. A comparable series of emulsions known as the "Rhoplex" series is marketed in this country by the Rohm and Haas Company of Philadelphia, Pa. Illustrative Rhoplexes are K–87, HA–8, and the like.

Many aziridine-terminated polymers of an average molecular weight range between 1000 and 6000 which lend themselves as wool modifying agents in this invention are commercially available products or can be made by known procedures. One group, for example, can be made by reacting a polyol with an alkylene oxide, then reacting the resulting alkoxylate with an excess of polyfunctional isocyanate such as toluene di-isocyanate and condensed with an alkylenimine to form the aziridine-terminated polymers. A group of commercially available, suitable alkylenimine (aziridine)-terminated polymers are available through the Interchemical Corporation, Carlstadt, N.J., and are designated as "ITP-"numbers. Examples of these are the following prepared as described below:

ITP-63A is a liquid, trifunctional proplyenimine-terminated polymer of polypropylene ether glycol having a molecular weight of about 3700. This polymer is made by condensing 50 mole parts of bound propylene oxide with 1 mole of glycerol, then treating the propoxylate first with toluene di-isocyanate, then propylenimine. The resulting polymer contains 3 aziridinyl radicals per mole and has an imine content of 0.65–0.67 meq./g. polymer and a viscosity of about 890 poises. The polymer has three of the following groups per molecule attached to a polypropylene ether glycol backbone:

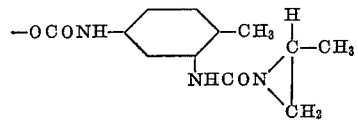

ITP–43 is a polymer having an average molecular weight of about 2600, and an aziridinyl content of about 0.65 meq./g. The ITP–43 polymer is prepared from a linear polyester (molecular weight of approximately 2100, made from the reaction of a diol with a dibasic acid) and contains the following imine groups attached to the backbone:

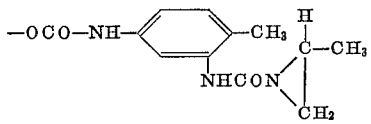

In addition to the cellulosic and keratin modifying agents and catalysts the treatment solution can contain one or more textile adjuvants such as softeners, surfactants, brighteners, antistatic agents, water-proofing agents and the like.

The treatment solutions can be applied to the wool-cellulosic substrate by any of the conventional application methods known in the textile art. These include, but are not limited to, padding, brushing, spraying, coating and the like. The reagents can be in the form of liquids, slurries, suspensions, emulsions, pastes, gels, where appropriate.

When the substrate has been treated to create a modifiable material, the treated and dried substrate can be shaped, cut, sewed or the like as long as activation or the removal of reagents is avoided.

The wool-cellulosic substrates which can be used in this invention vary widely insofar as structure, origin and characteristics are concerned. They can contain synthetic fibers as typified by polyamides, polyesters, acrylics and polyolefins among many others.

The substrates can be in the form of woven or knitted fabrics or non-woven assemblies, garments and the like.

The term "modify" as used herein is the generic term used to describe the alteration of characteristics that are to be made in the treated textile substrate. While in many instances the modifying agent employed is a resin, resin precondensate or crosslinking agent, the inventive process is not limited to specific agents, their analogues, homologues or derivatives. Rather the inventive process includes the use of any compatible mixture of cellulosic and keratin modifying agents which can be converted from their inactive or precursor state to their active state under compatible curing conditions.

To more explicitly show the workings of this invention in greater detail than is possible by discourse, the following illustrative examples are submitted.

These examples are preceded by a glossary of the performance test methods utilized.

CREASE RETENTION: AATCC–88C–1964T; TEST III-C [1]

Rating Scale:

(1) No crease remaining
(2) Slight crease
(3) Moderate crease
(4) Sharp crease
(5) Unchanged, very sharp crease

WASH AND WEAR: AATCC–88A–1964T; TEST III-C [1]

Five-point rating scale, ranging between (1) (extensively wrinkled) and
(5) (perfectly smooth)

ABRASION RESISTANCE (FLEX) IN CYCLES: ASTM D–1175–61T

All results in the examples apply to the warp direction, and unless otherwise noted, on the face of the fabric with the following severe testing conditions: 2-pound head pressure and 5-pound toggle tension on the Stoll Flex Abrader.

[1] Test III specifies laundering: Home-type washer, 5-pound load, full cycle, 60° C., synthetic detergent. Tumble drying (TD) is specified for Test III-C. The number of laundering-drying cycles (10) is indicated by 10L.

FUZZINESS RATING

The hairy appearance was expressed by the following numerical scale after brushing the fabric for 10 minutes on a testing machine:

(1) Severe fuzzing
(2) Considerable fuzzing
(3) Moderate fuzzing
(4) Slight fuzzing
(5) No (or negligible) fuzzing Fuzzing caused by laundering was rated after machine washing at 40–42° C. and tumble drying (10 such cycles).

Example 1

A 50% wool–50% rayon blend fabric sample is treated with an aqueous emulsion containing 12.5% HEU (dimethylol-dihydroxy-ethylene-urea), 4% ITP–63A (imine-terminated polymer), which is a product of the Interchemical Corporation, 2.0% polyethylene softener and 6.2% Aerotex Accelerator #5 [$Zn(NO_3)_2$ solution, product of American Cyanamid Co.] using a laboratory padder and setting the rolls at the pressure required to give 100% wet pickup.

The treated sample is dried at about 60° C. in a forced-draft oven to about 8% moisture content, creased along the warp, pressed for 20 seconds at 140–150° C. and cured at 160° C. for 15 minutes in a forced-draft oven. Testing is carried out on the cured sample.

For comparative purposes, a similar fabric sample is treated with an aqueous solution of 12.5% HEU, 6.2% Aerotex Accelerator #5 and 2% polyethylene softener omitting the shrinkproofing agent (ITP–63A), and also with 4% ITP–63A omitting the crosslinking agent (HEU) and the catalyst (Aerotex Accelerator #5). The above samples and a control sample (without any treatment) are exposed to the same creasing, pressing and curing procedure.

The physical properties of the samples are as follows:

| Sample | Wash/wear in TD 10L | Crease Reten. in TD 10L | Percent Shrinkage 10L W | F | Fuzziness 10L |
|---|---|---|---|---|---|
| Untreated | 2.0 | 1.0 | 18.0 | 19.5 | 2 |
| ITP treated | 3.0 | 1.0 | 2.5 | 2.5 | 4 |
| HEU treated | 4.0 | 4.0 | 4.5 | 5.5 | 3 |
| ITP+HEU treated | 4.5 | 4.5 | 1.5 | 1.5 | 4 |

Example 2

Example 1 is repeated using 4% Rhoplex E–287 (an acrylic emulsion produced and sold by the Rohm and Haas Co.) instead of 4% ITP–63A. The fabric is pressed and cured in the flat state.

The physical properties of the samples are as follows:

| Sample | Wash/wear in TD 10L | Flex abrasion 1# × 4# percent retention from untreated | Percent shrinkage 10L W | F | Fuzziness 10L |
|---|---|---|---|---|---|
| Untreated | 3.5 | | 15.5 | 18.0 | 2 |
| Rhoplex treated | 3.0 | 180 | 8.5 | 10.5 | 3 |
| HEU treated | 4.0 | 47 | 7.0 | 7.0 | 3 |
| Rhoplex+HEU treated | 4.0 | 60 | 4.5 | 5.0 | 4 |

Example 3

Example 1 is repeated using an aqueous treatment composition comprising 12.5% dimethylol dihydroxy-ethylene-urea, 2% polyethylene softener, 6.2% Aerotex Accelerator #5 and 4% of the following imine terminated polymers:

| Imine-terminated polymer | Preparation |
|---|---|
| ITP-43 | Col. 4, line 45 of this application. |
| [structure: 1-Aziridinyl-terminated polyester, wherein $n=5-6$ and $v=3-4$] | Example 11 of Ser. No. 569,016 filed Aug. 1, 1966. |
| [structure: Propylenimine-terminated polyester, wherein $n=5-6$ and $v=3-4$] | Example 12 of Ser. No. 569,016. |
| [structure: 1-Aziridinyl-terminated butadiene, wherein $u=55-65$] | Example 13 of Ser. No. 569,016. |
| [structure: Propylenimine-terminated polybutadiene, wherein $u=55-65$] | Example 14 of Ser. No. 569,016. |

In all instances results comparable to those obtained in Example 1 are obtained.

Example 4

Example 1 is repeated but 70% Avril–30% wool blend fabric samples is used and the HEU content of the emulsion is only 7.5% and its Aerotex Accelerator #5 content is only 3.0%.

The physical properties of the samples are as follows:

| Sample | Wash/wear in TD 10L | Percent Shrinkage 10L-TD W | Percent Shrinkage 10L-TD F | Fuzziness 10L | Flex Abrasion Warp-Orig. |
|---|---|---|---|---|---|
| Untreated | 3.0 | 7.0 | 7.5 | 3 | 850 |
| ITP-treated | 3.5 | 2.5 | None | 4 | 560 |
| HEU treated | 4.5 | 1.5 | None | 3 | 85 |
| ITP±HEU treated | 5.0 | 0.5 | None | 4 | 150 |

This invention is advantageous in both its compositional and process aspects. For example, the treated, modifiable cellulosic-wool textile compositions produced by the process of this invention are storable and easily activatable products which upon exposure to a curing environment yield a textile product having significantly improved wash-and-wear properties.

In its process aspects the inventive process offers several significant advantages, particularly when the wool content in cellulosic-wool blends is 50% by weight and higher. These include the development of a novel one-step process offering much shorter treatment cycles, lower labor and reagent costs than those previously available using the multistep process of the prior art. Further, only one combined curing cycle is required to cure both the wool and cellulosic compounds. An additional important advantage of the inventive process is that the resultant modified textile blends show a substantial improvement in wash-and-wear, crease retention, shrinkage, flex abrasion and fuzziness compared to that obtained by using the identical keratin and cellulosic modifying agents individually. Further advantages will suggest themselves to the reader after a perusal of this application.

As indicated above by the illustrated examples and the foregoing discussion, numerous modifications and changes in modifying agents, catalysts, methods of applying them, and curing conditions can be effected without substantially departing from the inventive concept. The metes and bounds of this invention are best illustrated by the claims which follow.

What is claimed is:

1. A process for modifying a fabric containing a blend of cellulosic and wool components whereby concurrently the cellulosic component is crosslinked and the wool component is shrinkproofed, said process comprising treating said fabric with a composition comprising 1 to 10% by weight of a polymer having aziridine terminal groups of the formula

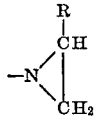

where R is hydrogen or methyl, said polymer having an average molecular weight of up to about 6000 and being capable of imparting shrinkproof properties to wool; an N-methylol crosslinking agent for cellulose; and an acid catalyst for said crosslinking agent, and heating said treated fabric until said polymer having aziridine terminal groups has modified said wool component and said N-methylol crosslinking agent has crosslinked said cellulosic component.

2. A process as claimed in claim 1 wherein a desired configuration is imparted to said treated fabric prior to said heating step.

3. A process as claimed in claim 1 wherein said N-methylol type crosslinking agent is dimethylol-dihydroxy-ethylene-urea.

4. A process as claimed in claim 1 wherein said acid catalyst is selected from the group consisting of magnesium chloride, magnesium nitrate, zinc chloride and zinc nitrate.

5. A process as claimed in claim 1 wherein the terminal group of the aziridine-terminated polymer is

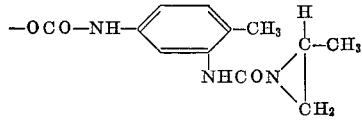

6. A process as claimed in claim 2 wherein prior to imparting a desired configuration to said treated textile material, said treated textile material is dried.

References Cited

UNITED STATES PATENTS

| | | | |
|---|---|---|---|
| 3,162,618 | 12/1964 | Smith | 260—77.5 |
| 3,169,122 | 2/1965 | Hennes | 260—47 |
| 3,220,869 | 11/1965 | Ruemens et al. | 117—11 |
| 3,165,375 | 1/1965 | Tesord | 8—127.6 |
| 3,225,013 | 12/1965 | Fram | 260—78 |
| 3,317,630 | 5/1967 | Yudle | 260—849 |

DONALD LEVY, Primary Examiner

B. BETTIS, Assistant Examiner

U.S. Cl. X.R.

8—116.3, 128